(12) United States Patent
Halpenny-Mason et al.

(10) Patent No.: US 12,066,406 B1
(45) Date of Patent: *Aug. 20, 2024

(54) ROTATABLE IMAGING SENSOR IN A WELLBORE

(71) Applicant: DarkVision Technologies Inc., North Vancouver (CA)

(72) Inventors: Michael Halpenny-Mason, North Vancouver (CA); Matt James, North Vancouver (CA); Graham Manders, North Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,455

(22) Filed: Apr. 10, 2023

Related U.S. Application Data

(63) Continuation of application No. 16/539,866, filed on Aug. 13, 2019, now Pat. No. 11,725,497.

(30) Foreign Application Priority Data

Aug. 16, 2018 (GB) ...................................... 1813356

(51) Int. Cl.
| | |
|---|---|
| *E21B 23/14* | (2006.01) |
| *E21B 47/002* | (2012.01) |
| *G01N 29/04* | (2006.01) |
| *G01N 29/24* | (2006.01) |
| *G01N 29/265* | (2006.01) |

(52) U.S. Cl.
CPC ......... *G01N 29/24* (2013.01); *E21B 47/0025* (2020.05); *G01N 29/043* (2013.01); *G01N 29/265* (2013.01); *E21B 23/14* (2013.01); *E21B 2200/20* (2020.05); *G01N 2291/106* (2013.01); *G01N 2291/2636* (2013.01)

(58) Field of Classification Search
None
See application file for complete search history.

(56) References Cited

U.S. PATENT DOCUMENTS

| | | | |
|---|---|---|---|
| 4,468,623 A | 8/1984 | Gianzero et al. | |
| 4,588,951 A | 5/1986 | Ohmer | |
| 4,757,716 A | 7/1988 | Nottingham et al. | |
| 5,947,213 A * | 9/1999 | Angle | E21B 23/00 |
| | | | 166/255.2 |
| 6,078,867 A * | 6/2000 | Plumb | G01V 1/50 |
| | | | 702/6 |
| 8,485,253 B2 | 7/2013 | Jacob | |

(Continued)

FOREIGN PATENT DOCUMENTS

| | | |
|---|---|---|
| CA | 685727 A | 5/1964 |
| CA | 2989439 A1 | 12/2016 |

(Continued)

*Primary Examiner* — Matthew R Buck
*Assistant Examiner* — Douglas S Wood

(57) ABSTRACT

A downhole imaging tool and method of operating the tool in a wellbore. An imaging sensor array at an end of the tool is rotatable about a longitudinal axis of the tool to image the well by sweeping out a 2D area of the well. Actuators in the tool provide rotation and/or extension of the sensor array to change perspective. An ultrasound phased-array may be used to measure and identify features of the well or objects.

18 Claims, 9 Drawing Sheets

(56) References Cited

U.S. PATENT DOCUMENTS

| | | |
|---|---|---|
| 8,651,183 B2 | 2/2014 | Guerrero et al. |
| 9,787,881 B2 | 10/2017 | Thursby et al. |
| 9,817,152 B2 | 11/2017 | Sofiienko et al. |
| 11,725,497 B2 * | 8/2023 | Halpenny-Mason ... E21B 23/00 700/251 |
| 2002/0166699 A1 | 11/2002 | Evans |
| 2009/0025941 A1 | 1/2009 | Iskander |
| 2010/0101359 A1 | 4/2010 | Breu et al. |
| 2011/0138903 A1 | 6/2011 | Large et al. |
| 2012/0048541 A1 | 3/2012 | Jacob |
| 2012/0048542 A1 | 3/2012 | Jacob |
| 2012/0131996 A1 | 5/2012 | Anish et al. |
| 2013/0292127 A1 | 11/2013 | Fenton |
| 2014/0352439 A1 * | 12/2014 | Scaccabarozzi ....... G01N 29/24 73/632 |
| 2015/0044013 A1 | 2/2015 | Perkins |
| 2016/0032717 A1 * | 2/2016 | Parker ................. E21B 47/12 324/369 |
| 2016/0259237 A1 | 9/2016 | Harris |
| 2016/0290847 A1 | 10/2016 | Gronsberg |
| 2016/0332296 A1 * | 11/2016 | Kurnianto ............. B29C 48/252 |
| 2018/0079476 A1 | 3/2018 | Abdellatif et al. |
| 2020/0249203 A1 | 8/2020 | Manders et al. |
| 2020/0337630 A1 | 10/2020 | Earthman et al. |
| 2021/0105405 A1 | 4/2021 | Robinson et al. |

FOREIGN PATENT DOCUMENTS

| | | |
|---|---|---|
| CN | 200985790 Y | 12/2007 |
| CN | 101363314 A | 2/2009 |
| CN | 205484210 U | 8/2016 |
| CN | 109281652 A | 1/2019 |
| GB | 2258331 A | 2/1993 |

* cited by examiner

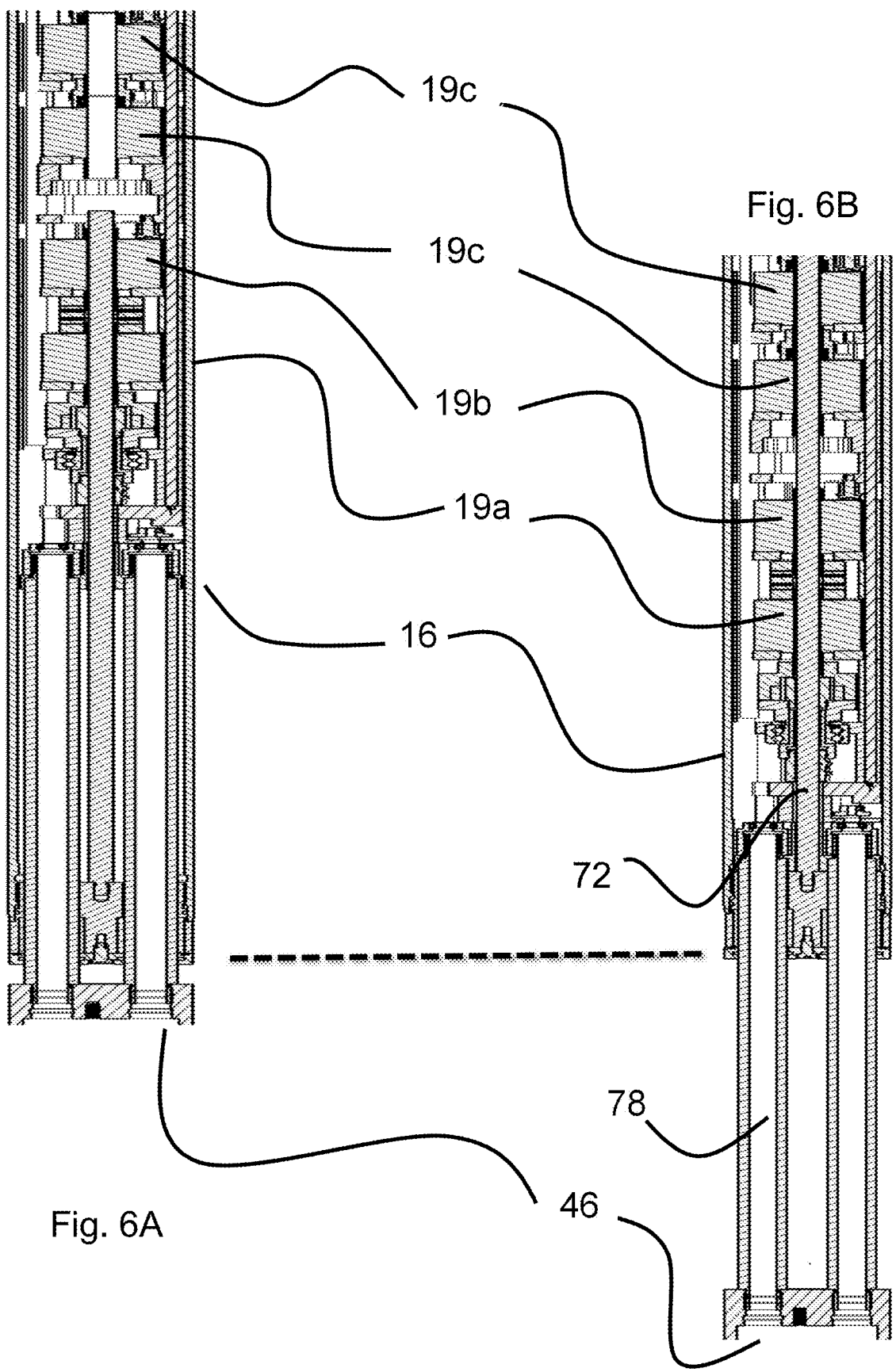

ROTATABLE IMAGING SENSOR IN A WELLBORE

FIELD OF THE INVENTION

The invention relates generally to operations within wellbores, in particular, operations to inspect or work on the wellbore. The invention is particularly useful where fine positioning of an end-effector is needed downhole.

BACKGROUND OF THE INVENTION

In oil and gas downhole systems, there often arises a need to inspect the wellbore for integrity or obstructions. Cracks in a casing, liner or tubing can lead to contamination to the environment or to drinking water or of methane to the atmosphere, which may affect global warming. There is thus a need to identify problems and work on the wellbore structures to protect the environment. Obstructions may be pipe deformations and items dropped, broken or left behind.

Known inspection techniques include cameras, ultrasound, backscatter X-ray and lead impression blocks. Part of the problem and need is identification of and qualifying aspects of the obstruction so that operators can make decisions to fix the problem. As taught in patents, US20160290847A1 on 6 Oct. 2016 to Bergen Technology, U.S. Pat. No. 8,787,881 on 10 Oct. 2017 to EV Offshore, and U.S. Pat. No. 9,817,152 on 14 Nov. 2017 to Visuray, various sensors may be mounted on a tool in a fixed position and orientation and moved through a wellbore. However, the fixed orientation of the sensor tends to limit the ability to view objects from desired perspectives.

Similarly, working on the wellbore may require fine movement of a tool, such as a fishing tool, cutter, mill, welder, drill or other manipulator.

One problem experienced by current downhole tools is the coarseness of the movement of the whole tool, which places effective limits on the image resolution and tool operation. Wireline and tractor movement resolution may be several centimeters and may suffer from stick and slip movements. On the other hand, known robotic systems that work in surface industrial applications tend to fail under the high temperatures, pressure and fluid contaminants found downhole.

SUMMARY

In accordance with a first aspect of the invention, there is provided a downhole device comprising: an elongate housing deployable in a well: an imaging sensor connected at a distal end of the housing and rotatable thereto, said sensor comprising a one-dimensional array of sensing elements arranged at least partly along a longitudinal axis of the housing: an actuator contained in the housing for rotating the imaging sensor, about said longitudinal axis, relative to the housing: and an imaging circuit arranged to capture and process data of the imaging sensor.

The device may further comprise a second actuator contained in the housing for extending the imaging sensor, away from the housing, along the longitudinal axis. The longitudinal axis may be parallel to an axis passing through the longitudinal centre of the housing.

The one-dimensional array may be curvilinear in form.

The sensing elements may be distributed over an arc, facing from along the longitudinal axis to substantially radially.

The sensing elements may be distributed over a downward arc spanning away from the longitudinal axis in opposed directions.

At least some of the sensing elements face uphole.

The housing may contain at least two further actuators coupled to the imaging sensor to move the imaging sensor substantially in a transverse plane with respect to the elongate housing.

The device may further comprise an actuator contained in the housing for fine extension of the end effector, with respect to the housing, along the longitudinal axis of the housing.

In accordance with a second aspect of the invention, there is provided a downhole device deployable in a well, comprising: an elongate housing connectable to a wireline or tractor for coarse movement along a longitudinal axis of the well; an end effector located at a distal end of the housing and distally extendable therefrom; and at least one actuator contained in the housing for fine extension of the end effector, away from the housing, along the longitudinal axis of the housing.

The fine extension may have a resolution of 1 mm or less.

The housing may contain at least two further actuators coupled to the end effector to move the end effector substantially in a transverse plane with respect to the elongate housing.

The device may comprise a second actuator contained in the housing for rotating the end effector, about said longitudinal axis, relative to the housing.

The device may comprise an imaging sensor coupled to the end effector and an imaging circuit arranged to capture and process data of the imaging sensor.

The device may comprise: a first and second component, each in sealing engagement with the housing and movable from inside to outside the housing, the first component coupling the at least one actuator to the end effector and the second component movable inside to compensate for a volume of the first component moved outside and vice versa.

The device may comprise a shielding component located in front of the end effector in its retracted configuration and behind the end effector in its extended configuration.

In accordance with a third aspect of the invention, there is provided a downhole device comprising: an elongate housing deployable in a well, the housing containing at least two actuators; and an end effector located at a distal end of the housing and transversely movable thereto, wherein the at least two actuators are coupled to the end effector to move the end effector substantially in a transverse plane with respect to the elongate housing, while maintaining the end effector's orientation during transverse movement.

The actuators may provide a movement resolution of the end effector of 1 mm or finer.

The at least two actuators may be coupled to the end effector via parallel linkages.

The device may comprise a further actuator contained in the housing for rotating the end effector, about said longitudinal axis, relative to the housing.

The device may comprise an imaging sensor coupled to the end effector and an imaging circuit arranged to capture and process data of the imaging sensor.

The device may comprise a further actuator contained in the housing for extending the end effector, away from the housing, along the longitudinal axis.

The device may comprise an imaging circuit arranged to capture and process data of the imaging sensor through its movement to create a three-dimensional image of a feature of the well.

The imaging sensor may comprise at least one of: acoustic sensors, ultrasound sensors, seismic sensors, magnetic sensors, inductive sensors, eddy current sensors, x-ray sensors or a camera.

The imaging sensor may comprise a two-dimensional array of downward facing sensing elements.

The end effector may be connected to the housing via a Delta robot. The Delta robot may comprise three pairs of parallel connection rods, two pairs connected to respective actuators and one pair not coupled to any actuator.

The actuators may be motors arranged coaxially in the housing, wherein one or more actuators are connected by linkages through sealed tubes to the end effector.

The device may comprise a centralizer for maintaining the housing substantially near a longitudinal center of the well.

The device may comprise connection means for connecting the device to a wireline or tractor for coarse deployment along a longitudinal axis of the well.

The end effector may be connected to a tool, selected from one of: a fishing tool, a welder, a milling tool, and a repair tool.

In accordance with a fourth aspect of the invention, there is provided a method of operating a downhole device having an imaging sensor rotatably coupled at a distal end of a housing. The method comprises: using a wireline, coiled tubing or tractor, deploying the device in a well to a first location: operating actuators within a housing of the device to rotate the imagine sensor about a longitudinal axis of the well: and capturing data from the imaging sensor as it rotates, wherein said sensor comprising a one-dimensional array of sensing elements arranged at least partly along a longitudinal axis of the housing.

The method may comprise moving the imaging sensor substantially in a transverse plane with respect to the housing.

The method may comprise extending the imaging sensor, relative to the housing, along a longitudinal axis of the housing.

The step of extending comprises moving the imaging sensor from an initial position uphole of a shield for the sensor to a second position downhole of the shield.

The imaging sensor may be rotated through an angle less than +90° from an initial angle in the well.

The method may comprise determining an edge of an object in the well as the imaging sensor rotates to limit the amount of rotation.

In accordance with a fifth aspect of the invention, there is provided a method of operating a downhole device having a robotic end effector. The method comprises deploying the device in a well to a first location; operating actuators within a housing of the device to move the end effector in a longitudinal direction with respect to the well to a second location; and operating, at the second location, a tool or sensor coupled to the end effector.

The method may comprise moving the end effector to the second location in transverse directions with respect to the well, wherein the transverse and longitudinal movements are substantially decoupled from each other.

In accordance with a sixth aspect of the invention, there is provided a method of operating a downhole device having a robotic end effector, the method comprising: deploying the device in a well to a first location; operating actuators within a housing of the device to move the end effector in transverse directions with respect to the well to a second location; and operating, at the second location, a tool or sensor coupled to the end effector.

The methods may comprise moving the end effector to the second location in a longitudinal direction with respect to the well, wherein the transverse and longitudinal movements are substantially decoupled from each other.

The methods may deploy the device on a wireline, coiled tubing or tractor.

The transverse and longitudinal movements may have resolutions of 1 mm or finer.

The methods may rotate the sensor about the longitudinal direction to image the well, preferably wherein the sensor comprises a one-dimensional array of downward-facing and outward-facing sensor elements.

The imaging sensor may comprise at least one of: acoustic sensors, ultrasound sensors, seismic sensors, magnetic sensors, eddy current sensors, inductive sensors, x-ray sensors or a camera.

The tool may be selected from one of: a fishing tool, a welder, a milling tool, and a repair tool.

The methods second position is radially offset from an object in the well, the method further comprising capturing images of the object at the second position using the sensor.

The methods may comprise determining the location of the end effector with respect to the transverse center of the well and moving the end effector to stay in the center.

It is an aim of preferred embodiments to inspect oil wells and prevent environmental contamination, by providing a robotic system operable in high temperatures, high pressure and fluid contaminants found downhole.

The method may comprise processing the data to create a two-dimensional image.

The method may comprise processing depth data of the sensor to create a three-dimensional model.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

FIG. 6A is a cross-sectional view of actuators in the housing in a retracted configuration.

FIG. 6B is a cross-sectional view of actuators in the housing in an extended configuration.

DETAILED DESCRIPTION OF THE PREFERRED EMBODIMENTS

Figure 1:
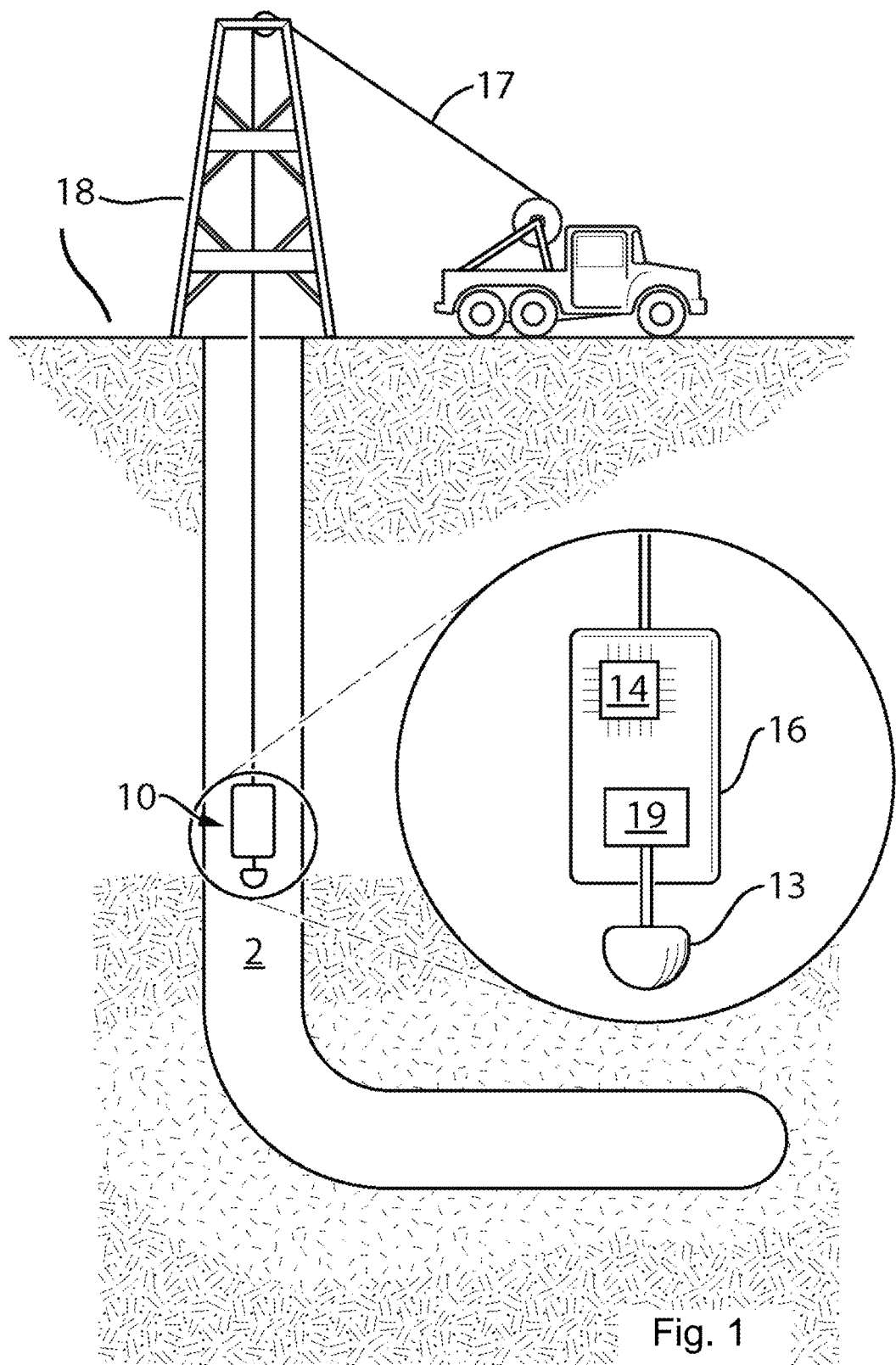
FIG. 1 is a cross-sectional view of a device deployed in a wellbore in accordance with one embodiment of the invention.
Figure 2:
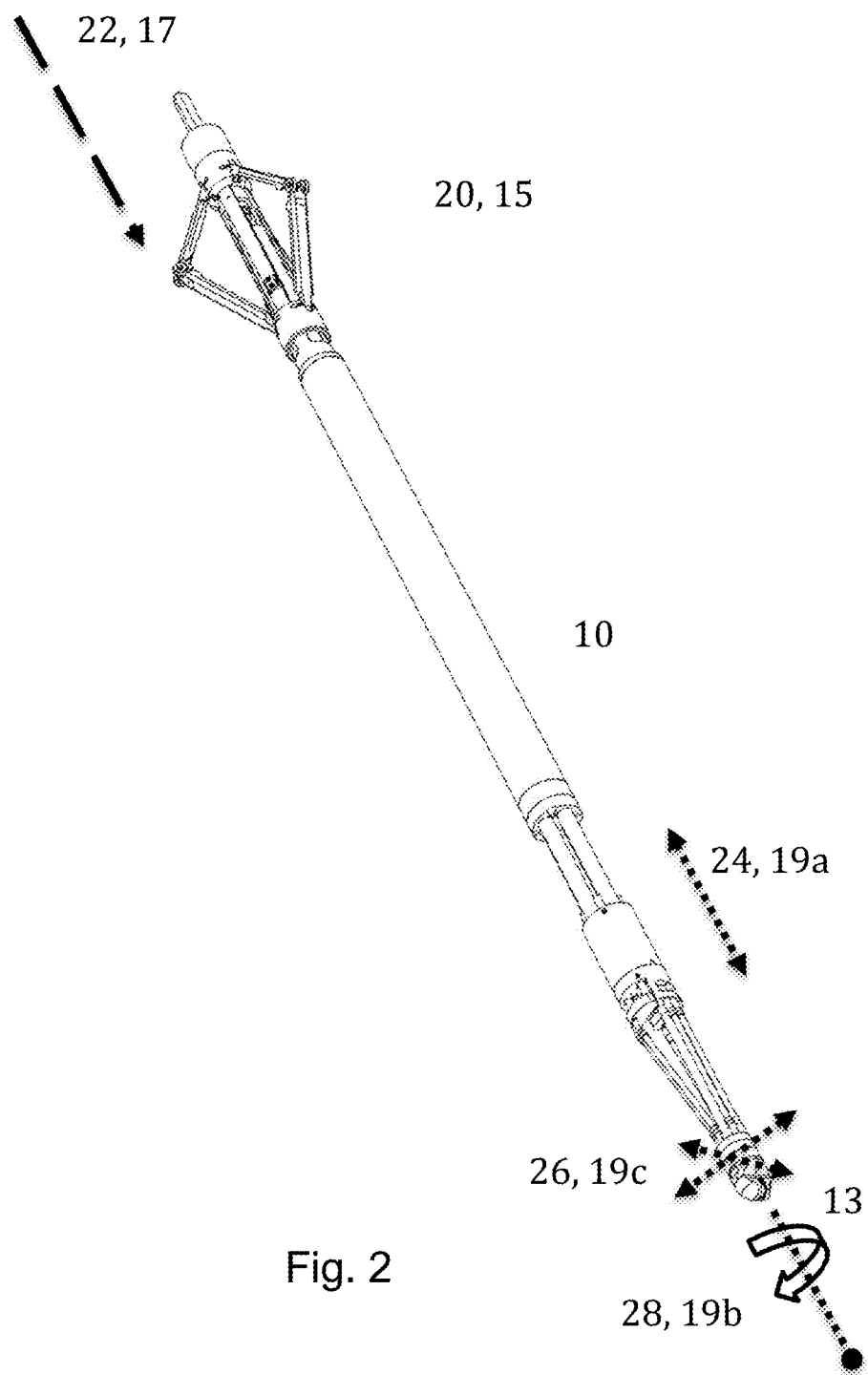
FIG. 2 is a perspective-view of a device showing degrees of movement.

With reference to the figures, devices and methods are disclosed for fine movement of a downhole robot end effector. The end effector may connect to an imaging sensor for imaging the condition of a wellbore and obstructions therein. The end effector may connect to a tool for working on or within the wellbore. In accordance with one embodiment of the invention, there is provided a downhole device 10 deployed in a wellbore 2, as illustrated in FIG. 1 and FIG. 2. The device 10 generally comprises end effector 13, housing 16, circuit 14, a plurality of actuators 19, and one or more centralizing elements 20.

As shown in FIG. 2 the end effector is independently manipulated in multiple directions, preferably maintaining a forward-facing (i.e. downhole) orientation. Coarse 22 and fine 24 movement of the end effector is provided along the longitudinal axis (also referred to as the axial axis or Z direction), which generally corresponds to the longitudinal axis of the well. Separate actuators provide transverse movement 26, also called side-to-side or x-y plane movement. As most wells and tubes are circular in cross section, this direction may also be called radial, i.e. moving from the center towards the well wall. The sensor may also be axially rotated (28) (i.e. about the Z axis or longitudinal axis or parallel to the longitudinal axis) using a separate actuator.

Additionally, it is useful to clarify that movement in the above co-ordinates is relative to the device or local part of the well, rather than some global reference frame, because wells may run both vertically and horizontally. Uphole refers to the Z-direction towards the operations site and downhole is away from the operations site. Similarly, distal refers to parts of the device further from the operator when the device is in use, and proximal refers to parts closer to the operator. Devices of the present systems tend to be elongate (i.e. long and thin) to be deployable within a wellbore. As used herein, longitudinal axis refers to the lengthwise direction of the device and includes axes parallel to the axis passing thru the center of the device. Transverse axes are perpendicular to a longitudinal axis.

Figure 3:
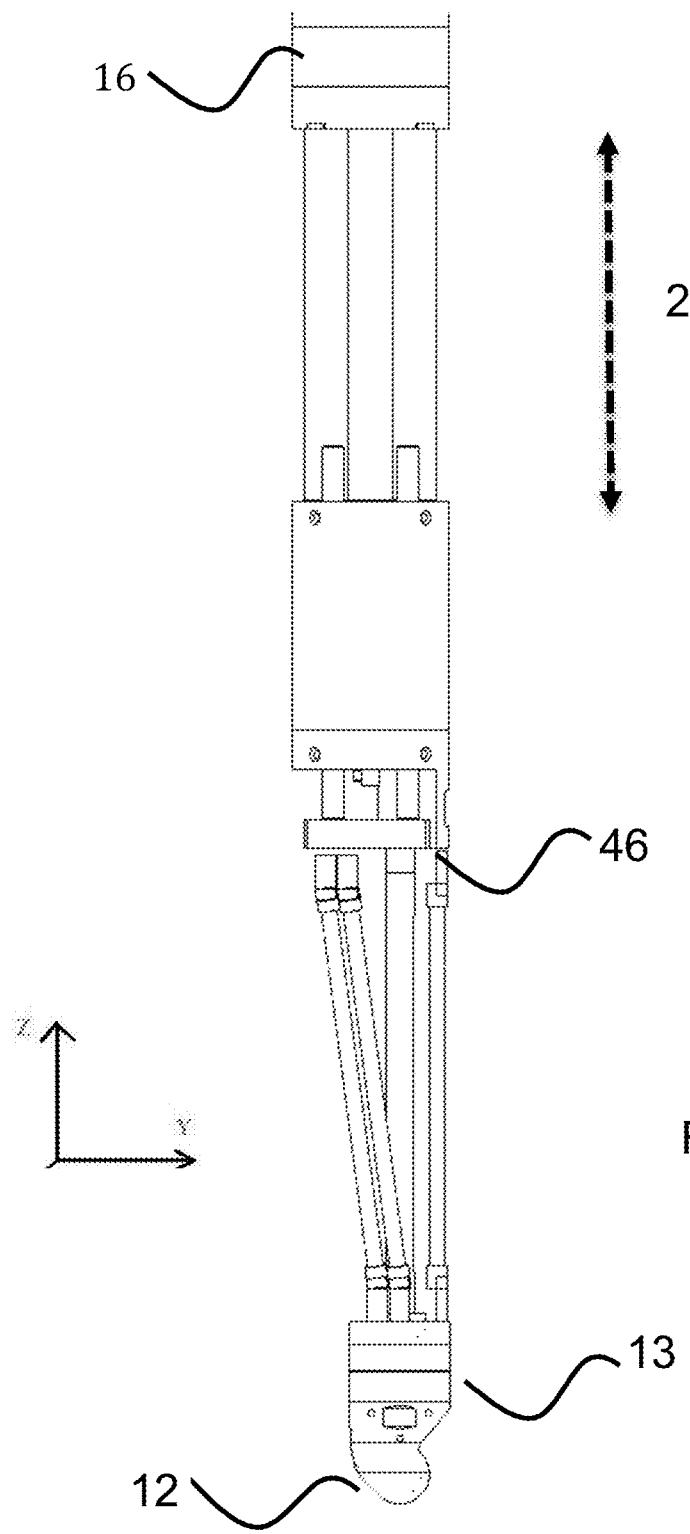
FIG. 3 is a side-view of a distal end of a device showing fine axial movement.
Figures 4A, 4B:
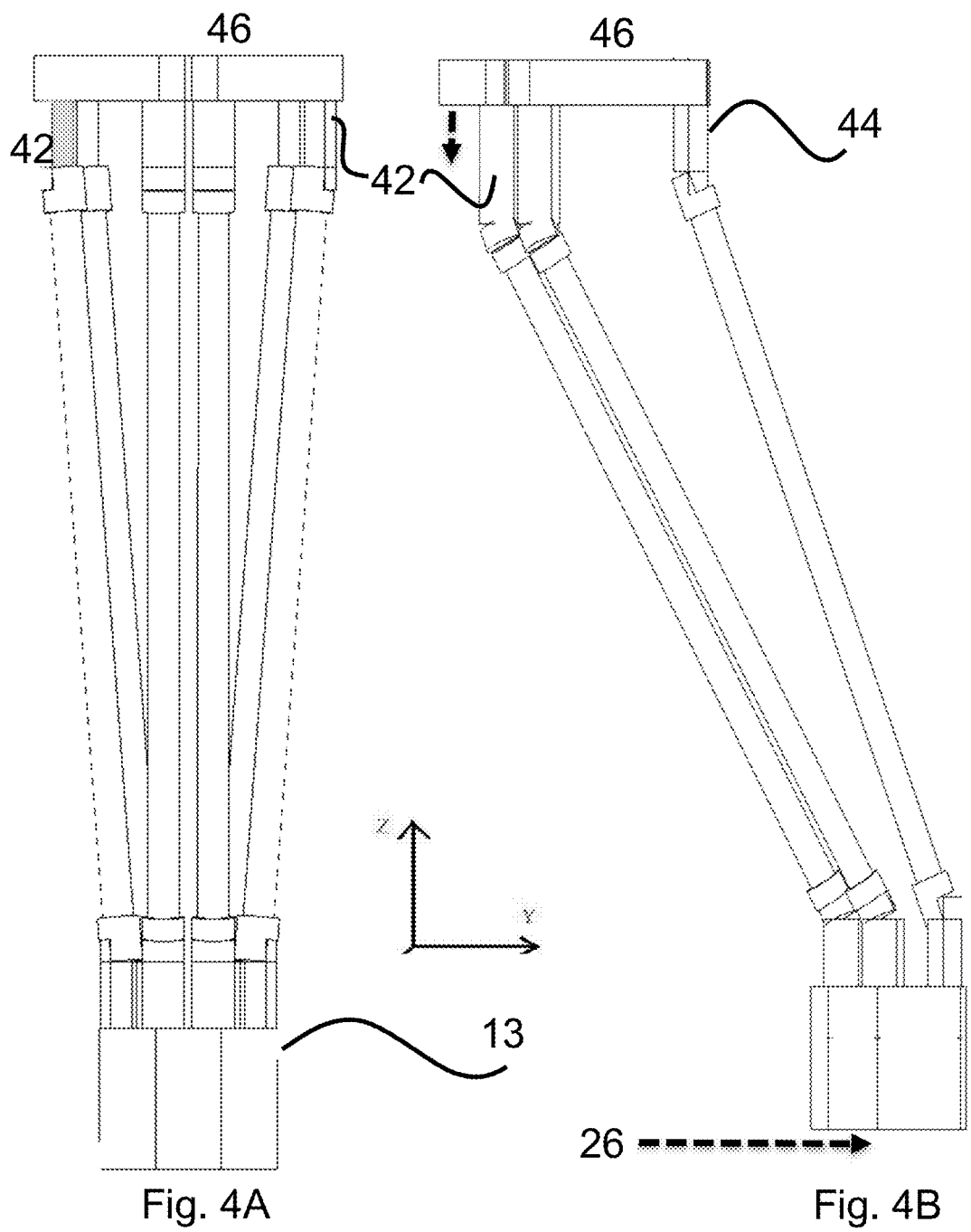
FIG. 4A is a side-view of a Delta robot in a centered position.
FIG. 4B is a side-view of a Delta robot in an off-center position.

FIG. 3 show the end effector 13 movable in the transverse (x and y) plane by a Delta robot connected at base 46. The base 46 extends longitudinally (along Z-axis) per movement 24 away from housing 16. FIGS. 4A and 4B illustrate the substantially transverse movement 26 of the end effector, provided by extending arms 42.

A tool may be located at the distal end of the end effector to operate on or within the wellbore. The tool may be any tool used downhole, especially where high precision is desired, such as a fishing tool, welder, milling tool, or repair tools for liners/casings. Such tools are typically powered by electricity provided at the surface down along the wireline but in some cases the device may contain an internal power source.

The tool may be deployed to an approximate position where the wellbore issue exists, then be extended axially and translated transversely to a more precise location to perform work. The tool may be precisely moved by the end effector as it operates. For example, a mill may cut into the wall by slowly, precisely translating the end effector in the transverse plane. Circuit 14 may comprise a processor and instructions to monitor and control the tool's operation.

Imaging System

The imaging system may be located at the end effector for imaging downhole, radially, uphole comprises an imaging sensor 12 and an imaging circuit 14 to transmit and/or receive signals from the sensor. The imaging sensor may comprise a plurality of sensing elements, preferably arranged as a one-dimensional or two-dimensional array (see FIG. 5A, 5B, 5C, 5D). The sensors may be acoustic sensors (including ultrasound and seismic sensors), magnetic sensors, eddy current sensors, or a camera. The camera may detect photons in the visual spectrum and may be of the CCD or CMOS type. The imaging sensor may be a phased array ultrasonic transducer having a plurality of transducer elements and operable in more than one mode, including Doppler mode and B-mode.

There may be many features within the fluid-carrying structure that are of interest for inspection, such as the innermost surface, casing, liner, and valves. Certain sensing techniques such as acoustic and X-ray backscatter can penetrate walls to detect the condition of these deeper features.

The frequency of the ultrasound waves generated by the transducer(s) is generally in the range of 200 kHz to 30 MHz, and may be dependent upon several factors, including the fluid types and velocities in the wellbore and the speed at which the device is moving. In most uses, the wave frequency is 1 to 10 MHz.

The number of individual elements in the transducer array affects the resolution of the generated images. Typically, each transducer array is made up of 32 to 2048 elements and preferably 128 to 512 elements. The use of a relatively large number of elements generates a fine resolution image of the wellbore.

Ultrasound transducers have been used to image inside wells and advantageously permit imaging in opaque fluids. Phased array ultrasound is an advanced method of ultrasonic imaging that has several advantages over conventional non-phased array ultrasound technology. Conventional (i.e. non-phased array) ultrasound technology uses a monolithic probe having a single element that emits a beam in a fixed direction. To test or interrogate a large volume of material, the probe must be mechanically steered to sweep the beam through the area of interest. In contrast, a phased array ultrasound system uses a probe having multiple elements generally arranged in parallel. Through sequential activation/pulsing of each element, a beam from the probe can be electronically steered at high speed through a wide two-dimensional area without having to move the probe.

Figure 5A:
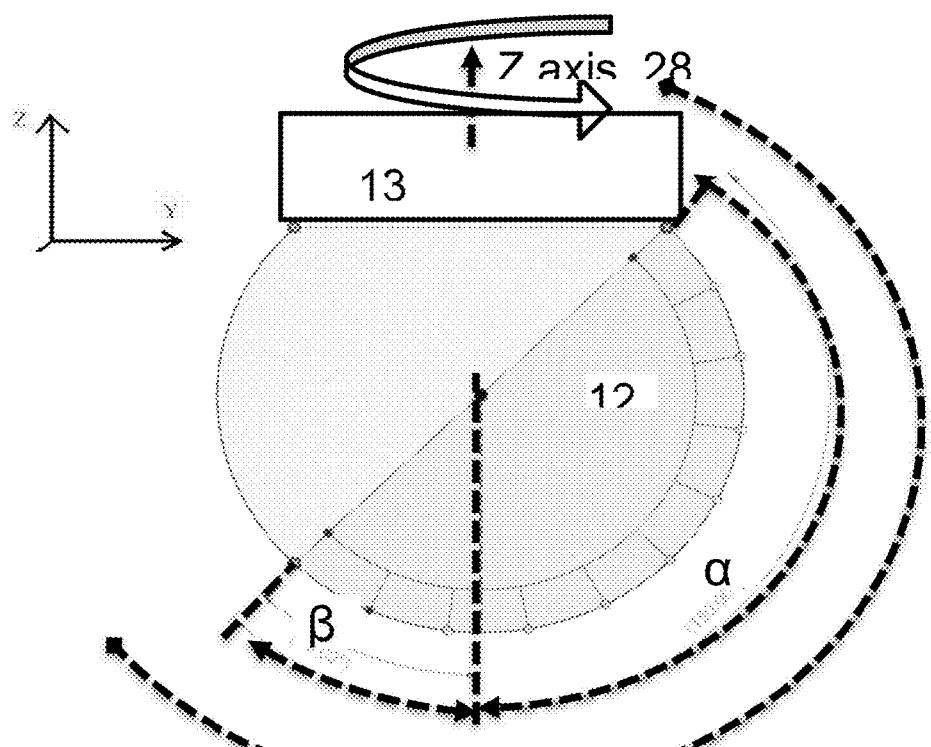
FIG. 5A is a perspective-view of a 1D curved sensor array and a field of view.
Figure 5B:
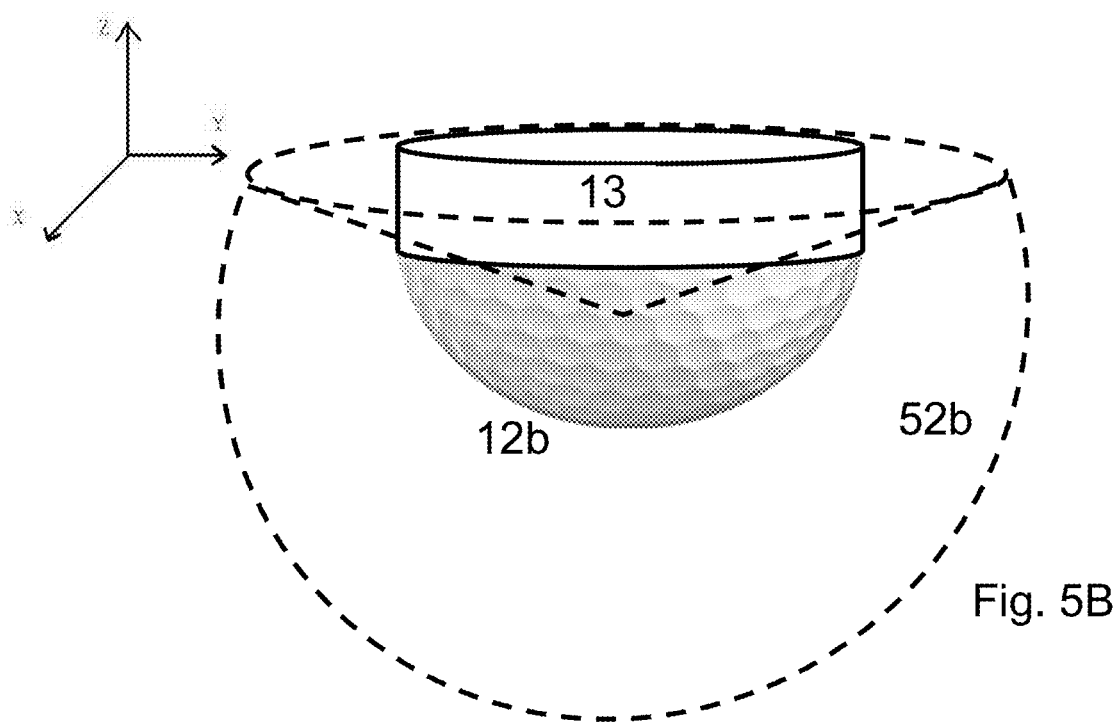
FIG. 5B is a perspective-view of a 2D sensor array and a field of view.
Figure 5C:
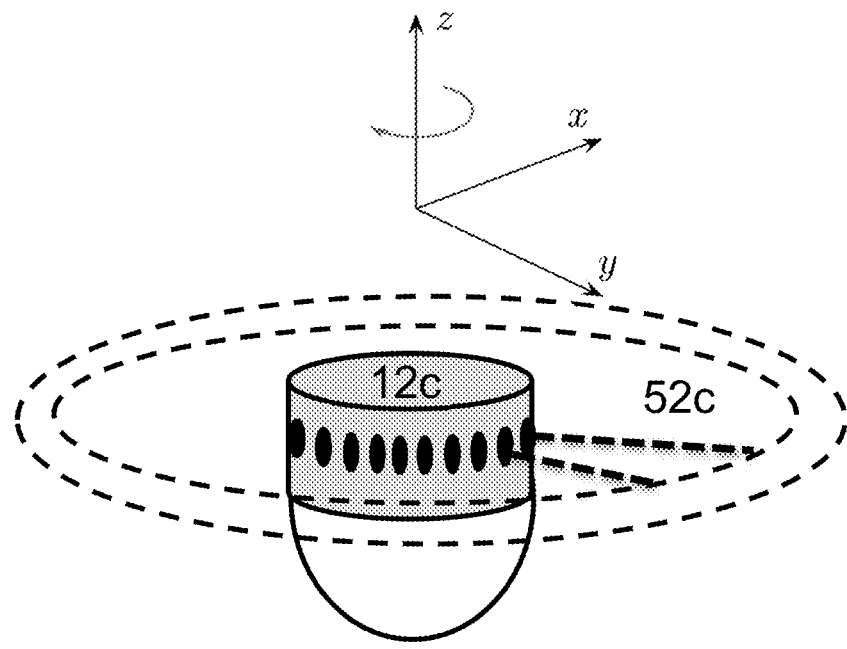
FIG. 5C is a perspective-view of a 1D radial sensor array and a field of view.

The device may comprise one or more different configurations of sensors located at a distal end of the device where precise movements are directed. FIG. 5A shows a 1D sensor array 12a, arranged with elements generally downwards and outwards from the device. FIG. 5B shows a 2D sensor array 12b of elements arranged generally on the surface of dome, facing generally downwards and outwards from the device to capture a volume without needing to be physically swept. FIG. 5C shows a 1D array of elements arranged radially about the device.

In the case of visual sensor elements (e.g. CCD or CMOS image sensors) the field of view is generally perpendicular to the face of each sensor element, with no depth information. However, with acoustic sensors and beam steering the field of view can extend up to 45° from the normal to provide the field of view 52a, shown in FIG. 5A.

Axially Distributed Sensors

As shown in FIG. 5A, a 1D array of sensing elements 12a may be arranged in a generally axial direction, which may be linear or curvilinear as shown. These elements image in a sector of view 52a.

The number of sensor elements, their pitch, and driving frequency affect the imaging quality. In acoustic sensors, a useful rule is that the pitch should be in the range of $\lambda/2$ and $\lambda$ to minimize grating lobes. Thus, in one embodiment, there may be 128 elements, spaced 300 μm (equal to $\lambda$) apart, driven at 5 MHz in water.

The angle over which the sensing elements are distributed determines how the sensor is used and what can be imaged. The skilled person will appreciate that, for a set number of elements, distribution over a greater arc reduces the imaging resolution. In FIG. 5A, sensing elements 12a are distributed over an arc $\alpha$ in the longitudinal-transverse plane, measured from the downhole longitudinal axis as shown. The arc $\beta$ is measured from the downhole longitudinal axis in a sector opposite the arc $\alpha$. The total sector of view 52a is $\alpha$ plus $\beta$ plus some amount of beam steering at each end. In the example shown, $\alpha$ is 135°, $\beta$ is 45° and beam steering extends ±15°, so that the sector viewable is (135+45+15+15) 210°.

In a first embodiment, the sensing elements may face outward and downward towards any object in front of (i.e. downhole of) or beside (i.e. radial to) the device, distributed over an arc $\alpha$ of about 90° (i.e. between 80 and 100°) from downhole to radial facing. Thus, the device is densely packed for high resolution and, without rotation, can image downhole to avoid collisions near dead-center and view the image the well wall. By rotating the imaging sensor axially (i.e. about a longitudinal axis of the device), the imaged sector sweeps a hemi-spherical 3D volume.

In a second embodiment (as shown in FIG. 5A), the arc $\alpha$ extends beyond 90°, possibly up to 180° and is only limited by the width of the end effector 13 and housing obstructing it. Thus, the device can image partly uphole, increasing the sector of view and allowing the features of interest to be viewed from the other side. By rotating the imaging sensor axially, the imaged sector sweeps a 3D volume equivalent to that shown by 52b.

In a third embodiment, the sensing elements extend into the next sector, that is, the arc $\beta$ may be 10-45°. In this case, the resolution may be lower for the same number of sensors as above. However, this allows the device to image better downhole, without having to rotate axially. Indeed, the device may fully sweep features downhole by merely rotating 180°.

Using beam steering, in each of the above embodiments, increases the sector of view by up to 45° at each extremity.

An operator may sweep the sensor through less than 360° if the object of interest is contained in a volume defined by a smaller arc. For example, for an obstruction located to the right of the sensor in FIG. 5A, it may be sufficient to sweep less than +90°, or even less than ±45° about the z-axis from an initial angle facing a feature in the well. The processor, in real-time, may process the image data to determine edges of the feature in order to limit the angle need to be swept. Edges may be detected using known techniques using visual data, such as a sudden change in neighboring pixel values, where the change extends along a continuous path. In x-ray and acoustic systems, edges may be detected by a sudden change of time of flight, which change extends along a continuous path.

Two-Dimensional Array

Alternatively, sensing elements may be distributed over a two-dimensional surface, such as a transverse plate or the dome shown in FIG. 5B, where the elements are generally downward facing (i.e. in a distal direction or away from the device). This allows the device to capture a 3D volume of view 52b, without the need to sweep the imaging sensor. As discussed, beam steering allows the acoustic sensor to image a greater field of view than the physical shape would otherwise indicate.

Radially Distributed Sensors

In one embodiment of the invention as shown in FIG. 5C, the imaging sensor 12 comprises a generally outward facing array of sensor elements 12c, radially surrounding the device. In the case of acoustic transducers, sound waves are emitted towards the walls of the wellbore (see dotted rings of FIG. 5C). The ring-shaped transducer can image a ring-shaped cross-section of the wellbore covering 360° around the device and is useful for thickness measurements. As the device is moved axially in the wellbore, in either a downhole or uphole direction, the ring-shaped transducer continually images cross-sections of the wellbore that are perpendicular to the longitudinal axis of the wellbore and generates a 3D image of the wellbore. The ring-shaped transducer may be oriented and positioned, such that it is concentrically aligned with the wellbore wall (i.e. the transducer array radiates outwards perpendicular to the longitudinal axis of the device which is preferably dynamically aligned with the longitudinal axis of the wellbore), or the radially-configured transducer can be angled uphole or downhole to form an oblique shaped cone. In the preferred embodiment, the radially-configured transducer is angled at approximately 10-30 degrees downhole, from the transverse plane Angling the wave energy prevents waves from bouncing back and forth from the wall, causing noisy echoes. Instead only the small proportion of wave energy that back-scatters from imperfections in the surface and voids in the wall is received.

Figure 5D:
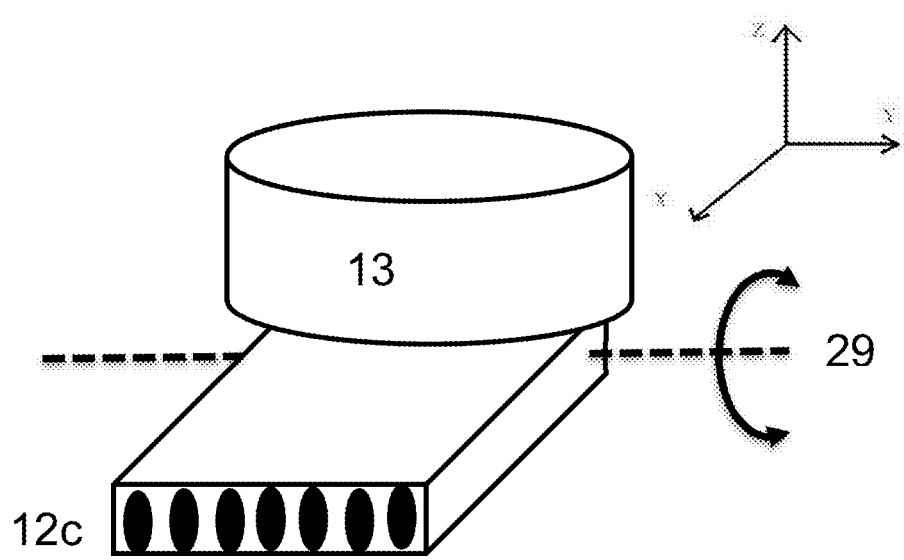
FIG. 5D is a perspective view of 1D radial sensor array capable of pitch.

In another embodiment, illustrated in FIG. 5D, a 1D array of radially facing sensor elements 12c are rotatably mounted at the end of end effector 13, which array may be pitched (rotation 29) uphole and downhole. These sensor elements may be distributed linearly or curvilinearly to form a transverse plane of view. Pitching the array, i.e. rotation about a transverse axis perpendicular to the direction of the sensors, enables the imaging device to sweep and capture a 2D field of view. In FIG. 5D, the sensors project along the X-axis and rotate about the Y-axis. The rotation may be provided by actuator 19b as shown in FIGS. 6A and 6B via linkages to a coupling at the end effector. The amount of pitch will typically be ±30-45° to enable an operator to capture partly both uphole and downhole fields of view.

Actuation of Degrees of Freedom

The housing 16 contains electronic drivers 14 and mechanical actuators 19 to provide multiple degrees of freedom (DOF) to an end effector, which is coupled to the imaging sensor: 4 DOF in the case of a 1D sensor array and 3 DOF in the case of a 2D sensor array. In preferred embodiments the actuators are electric motors, more preferably stepper motors. The electronic driver 14 provides a signal to drive the actuators and may receive position feedback to operate a closed-loop control system for one or more of the actuators.

In one arrangement, three actuators independently move the three pairs of parallel arms of the Delta configured manipulator. Thus, driving all three actuators at the same rate produces pure axial translation, whilst driving the actuators at different rates produces partly transverse motion. This arrangement requires accurately controlling all actuators for any desired movement and that all actuators have the same length of travel and resolution of movement.

However, in a preferred embodiment, transverse and axial movements are decoupled. FIG. 6A shows a cross-section of the housing 16 and layout of a plurality of actuators 19. Actuator 19a provides linear translation (Z) in the longitudinal direction of the end effector. Actuator 19b provides axial rotation (i.e. about the longitudinal axis Z) of the end effector. Two actuators 19c, 19c provide substantially transverse (X, Y) movement of end effector. Thus, the actuators substantially independently provide movement in X, Y, Z and about Z.

Locating all the actuators within the housing 16, reduces the end-effector inertia and increases its movement precision. The actuators may be coupled to their respective parts on the end-effector by any suitable means including cables, push-rods, screws and shafts. The plurality of actuators may be connected and move together linearly, within the housing, between the extended configuration of FIG. 6B and the retracted configuration of FIG. 6A (here the dashed line indicates the fixed distal end of housing 16). Thus, the relatively long Z movement does not require the other actuators to compensate.

As shown in FIG. 6A, the actuator motors 19a, 19b and 19c (collectively 19) may be arranged in-line with concentrically aligned drive shafts. This allows all the motors to fit within the long, thin form-factor shown. Motor 19a is fixed to a nut, which is mounted about a screw 72 (e.g. lead screw or ball screw) that is connected indirectly to the end effector (via base plate 46 and arms 42, 44). Therefore, rotating the nut linearly extends or retracts the screw 72, which acts axially to move the plate 46 that is connected to tubes 78. Tubes 78 are thus drawn out of the housing through a seal preventing well fluid entering the housing. Motors 19 may have a hollow bore, through which shaft 72 passes. Actuators 19b, 19c, and 19c may turn a shaft or extend/retract rods or cables that run off-centre, through respective tubes 78 to the base plate 46. These shafts, rods or cables connect to arms 42, 42 or to rotate the end effector 13 (see FIG. 4A).

The end effector is provided with relatively coarse and fine movements depending on the type the actuators, gearing, and play in the connections. The wireline movement is much coarser than the axial movement provided by the integrated actuator 19a, which itself may provide coarser movement than transverse 19c and rotation actuators 19b. Conversely the coarser movements may have more range. Motor 19a may drive a relatively coarse, long ball screw to provide fast axial displacement of at least 100 mm to compensate for the coarse precision of the wireline, more preferably at least 250 mm to enable the imaging sensor to scan the length of common well features, such as flow control devices. The axial resolution may be better than 2 mm (to enable tool operations), more preferably better than 0.5 mm (to enable imaging of surface features). The motors 19c may drive relatively shorter, finer pitch screws for transverse movement up to +100 mm from center, at an end effector resolution of about 1 mm (for tool operations), more preferably about 0.5 mm (for imaging of features). For example, a 400 step per revolution stepper motor turning a 2.5 mm/rev ball screw achieves 0.006 mm translation resolution.

The device may comprise a shielding component (not shown), such as a collar, shroud or projecting rods surrounding the end effector to protect the end effector from collisions whilst moving downhole. The shielding component may be fixed to the housing or movable thereto, being relatively located in front of the end effector in the end effector's retracted configuration and behind the end effector in its extended configuration. Thus, the device may be moved quickly to an approximate position using a wireline, all the while protecting the end effector. Then when in the desired position, the end effector extends from a position uphole of the shield to a position downhole of the shield.

Transverse Actuation

Actuators 19c in the housing provide fine transverse movement to the end effector, that is, perpendicular to the axial or longitudinal direction of the device. This motion is independent of the movement provided by the coarser axial actuator 19a. Conversely, articulated joints cause transverse and axial motion at the same time when any joint is driven.

FIG. 4A shows a Delta robot platform for moving the distal end 13 (i.e. the end effector or sensing platform) of the device where the sensor 12 is located. The Delta configuration provides transverse motion whilst maintaining the orientation of the end effector's tool or sensor. As seen in FIG. 4B, the movement of the pairs of parallelogram arms 42, 44 moves the sensor off-center, without changing the orientation of the end effector 13.

The Delta robot comprises three pairs of parallel arms 42, 42 and 44. The arms 42, 42 both pivot and extend from the proximal plate 46. Arms 42 are driven axially by actuators in the body 16 to provide two transverse degrees of freedom (DOF), with minimal axial translation (i.e. z movement). To maintain a more fixed longitudinal position, the axial actuator 19a may move to compensate for the slight arc during the transverse movement.

Compared to Delta robots used in pick-and-place operations, the Delta robot in preferred embodiments, is much longer than wide and the arm attachment at a proximal base 46, (rather than side frames) allows the end effector to move transversely beyond the base 46. That is, the end effector has great transverse movement in a small form factor for the device.

The linkage geometry of the Delta robot multiplies the linear movements of arms 42 to create transverse movement 26 proportional to the lengths of arms 42, 44 relative to the separation of the arms. Thus, for example, a movement resolution of 0.1 mm at arms 42 may result in a transverse movement 26 with resolution of 1 mm. Thus, in preferred embodiments, arms 44 are fixed to the proximal base 46 but pivotable thereto. Thus, the axial movement of the end effector is provided independently by actuator 19a and without magnifying the movement error via the linkages.

The skilled person will appreciate that other configurations may provide transverse manipulation of the end-effector, independent from an axial drive, such as a Cartesian manipulator.

Centralizing Elements

The device 10 may also include one or more centralizers for keeping the device in the center of the wellbore. FIG. 2 illustrates one embodiment of a centralizer 20, wherein the element includes spring-loaded centralizing rods that extend outwardly and are biased to abut the inner wall of the well casing or liner, keeping the device in the center of the wellbore.

Deployment System

The device includes a connection to a deployment system for running the device 10 into the well 2 and removing the device from the well. Generally, the deployment system is a wireline 17 or coiled tubing that may be specifically adapted for these operations. Other deployment systems can also be used, including downhole tractors and service rigs. An operations truck winds and unwinds the wireline or coiled tubing on a drum to provide coarse longitudinal movement to the device.

Power & Memory System

The imaging system can be powered by an electric cable run from the well surface or by onboard batteries. The data from the imaging system can be conveyed uphole to the well surface through a transmission line for immediate viewing of the images in real-time. The data may also be stored onboard the device for later retrieval in the event of a communication loss. The imaging system may record images continually or it may be triggered manually and/or automatically, such as through the use of movement triggers.

Sensor Processing

The circuit 14 may comprise a processor, such as a FPGA, CPU and/or GPU, for receiving, storing, processing, and transmitting sensor data to the operator. The processor has software or firmware instructions to perform functions such as image pre-processing. Pre-processing the raw sensor data may remove noise/artifacts and combine data from different sensing elements at different time slices to create a processed data stream, which can be sent to the surface at a much lower bandwidth.

As described above, the sensor ideally comprises a high number of finely pitched sensing elements to provide high-resolution images. In various embodiments, these are typically provided in multiples of 64 for ease of digital addressing. For example, there may be more than 127 elements, preferably more than 255 elements. However, as the present imaging sensor is separated from the sensor circuit located in the housing 16, this would require hundreds of electrical connectors. Therefore, in the present device multiplexing chips (MUX) are located outside of the housing, near the imaging sensor. The MUX is connected to hundreds of elements and selects a subset for activation (pulse transmitting and receiving). The subset of signals is communicated back to the sensing circuit 14 using far fewer connectors, preferably 64 or fewer, more preferably 32 or fewer. Each connector may be a twisted pair or coaxial cable.

As the device moves in the well, it is likely that the imaging sensor will not be in the (transverse) center of the well. Indeed, the profile of the well or features of interest may change along its length. In use cases, where the well profile or wall thickness are of interest, maintaining the sensor in the centre produces the highest resolution images. Thus, in a preferred embodiment, the processor determines, in real-time, the position of the imaging sensor with respect to the center of the well (i.e. shape or position in a transverse plane, rather than the longitudinal center). The processor may measure the distance from the well feature of interest to the sensing elements. For example, the distance may be known from the time-of-flight from transmittal and reception of pulses backscattered from the well's inner-surface/casing/liner. The processor may determine the centre in the transverse plane (I.e. the X-Y plane) using a Ransac circle-detection function, which assumes the feature is a circle (or more generally, an ellipse) and fits the distance data from around the imaging sensor to a best circle (or ellipse).

The processor then identifies an off-centre vector, i.e. an amount and direction that the sensor is currently away from the centre of the well feature. This vector is used to drive the transverse actuators 19c towards the feature's center, thus automatically, and continuously maintaining the sensor in a centered position, as it moves through the well.

Pressure Management

Figure 7:
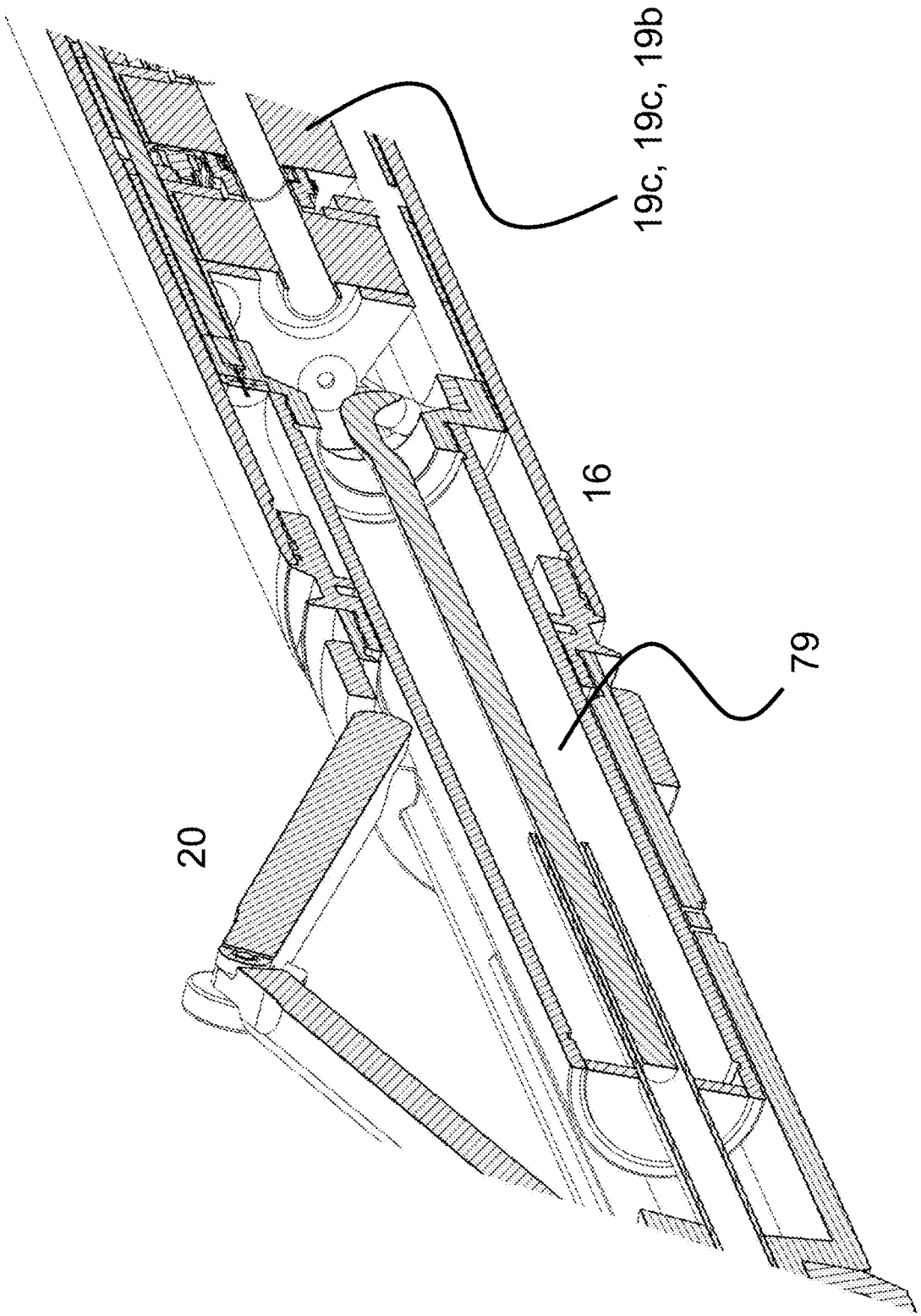
FIG. 7 is a cross-sectional view of a proximal portion of the device.

In several applications of the present system, the tool is exposed to high pressures in the well bore fluid, so it is desirable to compensate or withstand the absolute pressure or pressure differentials experienced by parts of the device. The housing may be designed sufficiently strong to withstand high pressure fluid outside and lower pressure inside. The housing may comprise seals around components that pass through the housing and move relative thereto, such as tubes 78 that act on the end effector. As seen in FIG. 6B, as the end effector extends from the housing, drive tubes 78 move from inside the housing to the outside, effectively creating a vacuum in the housing. To remove this pressure differential, the device comprises a volume compensator 79 coupled to the housing and movable thereto (see FIG. 7). Thus as the tubes 78 move out of the housing, the volume compensator is drawn into the housing in equal volumetric measure. There is therefore no net volume change and no change in pressure differential from inside to outside the housing. The compensator may be a bellows or a piston and may be located at an opposed end of the housing from the end effector.

The cross-section of the compensator 79 may be substantially equal to the total cross-section of the tubes, such that the distances moved are substantially equal. The tubes and compensator's piston 79 may be coupled and move together.

The compensator may extend and retract within a hollow of a portion of the device located proximal (i.e. uphole) of the housing 16. In a preferred embodiment, this portion is a second housing 15 or hollow shaft, with centralizer 20 on its exterior. Advantageously the device form factor is kept small, as the compensator moves within the length in which the centralizer expands outwardly.

The housing may be positively pressurized before deployment into the well. Positive pressure in the housing ensures that pressurized wellbore fluid is not drawn into the housing. Additionally, the housing seals are designed to engage when the housing pressure is greater than the wellbore pressure.

Operation

The present device may be operated by an operator at the surface of the well using manual controls such as joysticks or using a user interface via a computing device. Control signals are sent from the operators input down the wireline to the device's control board 14. This controls the actuators 19 to provide multiple degrees of freedom (DOF): 4 DOF in the case of a 1D sensor array and 3 DOF in the case of a 2D sensor array. The wireline provides an additional, but coarse, longitudinal DOF and this typically controlled at the surface by an operator of a wireline truck.

Figure 8:
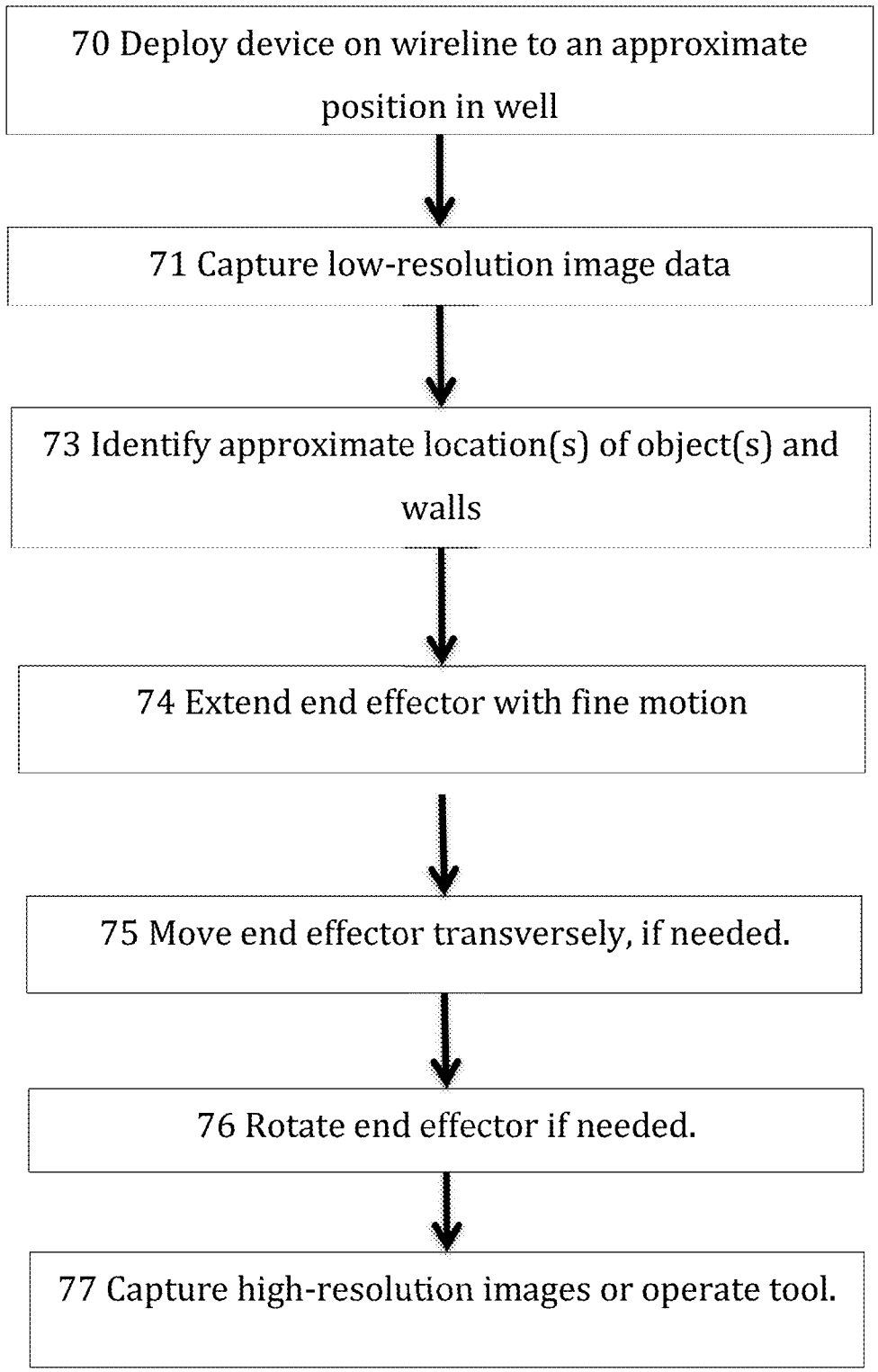
FIG. 8 is a workflow for operating the device.

With reference to FIG. 8, the device is deployed into a well and lowered using a wireline to an approximate location to begin the scan (70). Wells may be kilometers long and the location of interest may only be approximately known or reachable. Slack and stretch in the wireline mean that high-precision positioning is not possible using the wireline alone. The sensors may be used in low-resolution mode during the coarse, fast deployment to the approximate location. In low-resolution mode, well diameter, lost objects, and valves are detectable in real-time, although surface texture and wall thickness might not be determinable. Thus, in preferred operations, the coarse motion and low-resolution scan precede the fine motion and high-resolution scan The device may capture images of the well as it moves towards the location to improve accuracy (71). This pre-scan may be a faster, low-resolution scan to locate the location of interest. It may be possible to identify obstructions or deformations in the well during this pre-scan (73). Not only does this inform the locating step but also prevents the forward-facing sensor from hitting any obstruction in front of it.

The imaging sensor is further translated axially using the fine movement of actuator 19a towards an object of interest in the well (74). The imaging sensor may also be translated transversely (75) as shown in FIG. 4B. Transverse movement provides 2 DOF to the operator. The Delta configuration robot provides that the sensor orientation does not change with the transverse movement. The slight axial movement during translation may be compensated by slightly extending/retracting using actuator 19a.

The operator may move the end effector off-center to inspect one side of the well wall or move to a side of an obstruction to provide a better imaging perspective.

With the imaging sensor in the desired location and perspective, the device captures image data, preferably moving in the high-resolution directions (77). In the case of a 1D array, the array is rotated axially (step 76) about or parallel to a longitudinal z axis of the device to sweep the volume.

In the case of a camera, a two-dimensional surface image is captured. With an acoustic sensor, pulses can be focused to different depth to capture a three-dimensional depth image. FIGS. 5A and 5B show the radiating field of views 52a, b, c which may extend outward from the sensor face to some distance set by the operator or physical limits of the sensor.

Although the present invention has been described and illustrated with respect to preferred embodiments and preferred uses thereof, it is not to be so limited since modifications and changes can be made therein which are within the full, intended scope of the invention as understood by those skilled in the art.

Certain aspects may be described by the following numbered clauses:

1. A downhole device deployable in a well, comprising:
   a. an elongate housing connectable to a wireline or tractor for coarse movement along a longitudinal axis of the well;
   b. an end effector located at a distal end of the housing and distally extendable therefrom: and
   c. at least one actuator contained in the housing for fine extension of the end effector, away from the housing, along the longitudinal axis of the housing.
2. The device of clause 1, wherein said fine extension has a resolution of 1 mm or less.
3. The device of clauses 1 or 2, wherein the housing contains at least two further actuators coupled to the end effector to move the end effector substantially in a transverse plane with respect to the elongate housing.
4. The device of clause 1, 2 or 3, further comprising a second actuator contained in the housing for rotating the end effector, about said longitudinal axis, relative to the housing.
5. The device of anyone of clauses 1-4, further comprising an imaging sensor coupled to the end effector and an imaging circuit arranged to capture and process data of the imaging sensor.
6. The device of anyone of clauses 1-5, further comprising:
   a. a first and second component, each in sealing engagement with the housing and movable from inside to outside the housing,
   b. the first component coupling the at least one actuator to the end effector and
   c. the second component movable inside to compensate for a volume of the first component moved outside and vice versa.
7. The device of anyone of clauses 1-6, further comprising a shielding component located distal of the end effector in its retracted configuration and proximal of the end effector in its extended configuration.
8. A downhole device comprising:
   a. an elongate housing deployable in a well, the housing containing at least two actuators; and
      an end effector located at a distal end of the housing and transversely movable thereto,
   b. wherein the at least two actuators are coupled to the end effector to move the end effector substantially in a transverse plane with respect to the elongate housing, while maintaining the end effector's orientation during transverse movement.
9. The device of clauses 8, wherein said actuators provide a movement resolution of the end effector of 1 mm or finer.
10. The device of clause 8 or 9, wherein the at least two actuators are coupled to the end effector via parallel linkages.
11. The device of anyone of clauses 8-10, further comprising a further actuator contained in the housing for rotating the end effector, about said longitudinal axis, relative to the housing.
12. The device of anyone of clauses 8-11, further comprising an imaging sensor coupled to the end effector and an imaging circuit arranged to capture and process data of the imaging sensor.
13. The device of anyone of clauses 8-12, further comprising a further actuator contained in the housing for extending the end effector, away from the housing, along the longitudinal axis.
14. A method of operating a downhole device having a robotic end effector, the method comprising:
    a. deploying the device in a well to a first location;
    b. operating actuators within a housing of the device to move the end effector in a longitudinal direction with respect to the well to a second location; and
    c. operating, at the second location, a tool or sensor coupled to the end effector.
15. The method of clause 14, further comprising moving the end effector to the second location in transverse directions with respect to the well, wherein the transverse and longitudinal movements are substantially decoupled from each other.
16. A method of operating a downhole device having a robotic end effector, the method comprising:
    a. deploying the device in a well to a first location;
    b. operating actuators within a housing of the device to move the end effector in transverse directions with respect to the well to a second location: and
    c. operating, at the second location, a tool or sensor coupled to the end effector.
17. The method of clause 16, further comprising moving the end effector to the second location in a longitudinal direction with respect to the well, wherein the transverse and longitudinal movements are substantially decoupled from each other.
18. The method of any of clauses 14 to 17, wherein the device is deployed on a wireline, coiled tubing or tractor.
19. The method of clauses 14 or 18, wherein the transverse and longitudinal movements have resolutions of 1 mm or finer.
20. The method of any of clauses 14 to 19, further comprising rotating the sensor about the longitudinal direction to image the well, preferably wherein the sensor comprises a one-dimensional array of downward-facing and outward-facing sensor elements.

21. The method of any of clauses 14 to 20, wherein the imaging sensor comprises at least one of: acoustic sensors, ultrasound sensors, seismic sensors, magnetic sensors, eddy current sensors, inductive sensors, x-ray sensors or a camera.

22. The method of any of clauses 14 to 21, wherein the tool is selected from one of: a fishing tool, a welder, a milling tool, and a repair tool.

23. The method of any of clauses 14 to 22, wherein the second position is radially offset from an object in the well, the method further comprising capturing images of the object at the second position using the sensor.

24. The method of any of clauses 14 to 23, further comprising determining the location of the end effector with respect to the transverse center of the well and moving the end effector to stay in the center.

The invention claimed is:

1. A downhole device comprising:
a housing deployable in a well;
an imaging sensor connected at a distal end of the housing and rotatable thereto, said sensor comprising an ultrasound phased-array arranged at least partly along a longitudinal axis of the housing, wherein the ultrasound phased-array is curvilinear in form with a plurality of transducer elements distributed over an arc in a longitudinal-transverse plane;
an actuator contained in the housing for rotating the imaging sensor, about said longitudinal axis, relative to the housing; and
an imaging circuit arranged to capture and process data of the imaging sensor.

2. The device of claim 1, further comprising a second actuator contained in the housing for extending the imaging sensor, away from the housing, along the longitudinal axis.

3. The device of claim 2, wherein said extending has a movement resolution of 1 mm or less.

4. The device of claim 1, wherein the longitudinal axis is parallel to an axis passing through the longitudinal centre of the housing.

5. The device of claim 1, wherein the plurality of transducer elements are distributed over an arc spanning downhole and radial of the device.

6. The device of claim 1, wherein at least some of the transducer elements in the plurality of transducer elements face uphole.

7. The device of claim 1, wherein the housing contains at least two further actuators coupled to the imaging sensor to move the imaging sensor substantially in a transverse plane with respect to the housing.

8. The device of claim 7, wherein said transverse movement has a movement resolution of 1 mm or less.

9. The device of claim 1 wherein the housing contains at least two further actuators coupled to the end effector to move the end effector substantially in a transverse plane with respect to the housing.

10. The device of claim 1, further comprising:
a first and second component, each in sealing engagement with the housing and movable from inside to outside the housing,
the first component including an arm coupling the at least one actuator to the end effector, and
the second component including a volume compensator movable inside the housing to compensate for a volume of the first component moved outside the housing and vice versa.

11. The system of claim 1, the housing being an elongate housing.

12. A method of operating a downhole device having an imaging sensor rotatably coupled at a distal end of the device's housing, the method comprising:
using a wireline or tractor, deploying the device in a well to a first location: operating actuators within a housing of the device to rotate the imaging sensor about a longitudinal axis of the well; and
capturing data from the imaging sensor as it rotates,
wherein said imaging sensor comprising an ultrasound phased-array arranged at least partly along a longitudinal axis of the housing, and the ultrasound phased-array is curvilinear in form with a plurality of transducer elements distributed over an arc in a longitudinal-transverse plane.

13. The method of claim 12, further comprising processing the data to create a two-dimensional image.

14. The method of claim 12, farther comprising processing depth data of the sensor to create a three-dimensional model.

15. The method of claim 12, further comprising moving the imaging sensor substantially in a transverse plane with respect to the housing.

16. The method of claim 12, further comprising extending the imaging sensor, relative to the housing, along a longitudinal axis of the housing.

17. The method of claim 12, wherein the imaging sensor is rotated through an angle less than ±90° from an initial angle in the well.

18. The method of claim 12, further comprising determining an edge of an object in the well as the imaging sensor rotates to limit the amount of rotation.

* * * * *